US011682094B2

(12) United States Patent
Del Forn et al.

(10) Patent No.: US 11,682,094 B2
(45) Date of Patent: Jun. 20, 2023

(54) PUBLIC REPORTING OF POWER LINE-DOWN CONDITIONS

(71) Applicant: Florida Power & Light Company, Juno Beach, FL (US)

(72) Inventors: Erik L. Del Forn, Juno Beach, FL (US); Iliana M. Rentz, West Palm Beach, FL (US); Jeffrey D. Dubs, Jupiter, FL (US); Steve D. Shnider, Wellington, FL (US); Roberto C. Taninaka, Miami, FL (US); Juan P. Lopez, Miami, FL (US); Hari B. Dumpa, Pembroke Pines, FL (US); Syed S. Ali, Parkland, FL (US); Donna M. Miceli, Jupiter, FL (US)

(73) Assignee: Florida Power & Light Company, Juno Beach, FL (US)

( * ) Notice: Subject to any disclaimer, the term of this patent is extended or adjusted under 35 U.S.C. 154(b) by 173 days.

(21) Appl. No.: 16/741,253

(22) Filed: Jan. 13, 2020

(65) Prior Publication Data
US 2021/0217120 A1   Jul. 15, 2021

(51) Int. Cl.
*G06Q 50/26* (2012.01)
*G06F 40/279* (2020.01)
*G06V 20/52* (2022.01)

(52) U.S. Cl.
CPC ......... *G06Q 50/265* (2013.01); *G06F 40/279* (2020.01); *G06V 20/52* (2022.01)

(58) Field of Classification Search
CPC ............... G06Q 50/265; G06F 40/279; G06K 9/00624; G06K 9/00771; G06V 20/00
See application file for complete search history.

(56) References Cited

U.S. PATENT DOCUMENTS

| 4,818,990 A | * | 4/1989 | Fernandes | G05D 1/0038 340/310.17 |
| 6,072,858 A | | 6/2000 | Bellin | |

(Continued)

FOREIGN PATENT DOCUMENTS

| WO | 2016147202 | 9/2016 |
| WO | 2018175656 | 9/2018 |

OTHER PUBLICATIONS

Nguyen et al, "Intelligent Monitoring and Inspection of Power Line Components Powered by UAVs and Deep Learning," Mar. 25, 2019, IEEE Power and Energy Technology Systems Journal, vol. 6, No. 1, pp. 11-21 (Year: 2019).*

(Continued)

*Primary Examiner* — Alvin H Tan
(74) *Attorney, Agent, or Firm* — Fleit Intellectual Property Law; Jeffrey N. Giunta

(57) ABSTRACT

Systems and methods to process many power line-down reports. A number of power line-down reports are received from different devices operated by users that specify the location of its device. Based on locations of devices sending the reports, a related set of power line-down reports is determined that likely report a particular power line-down condition. Based on those locations and power line location information, a location of the particular power line-down condition is determined that is a location of a power line that is closest to all locations in the related reports. Based on the related set of reports, a consolidated power line-down report is created with data associated with the particular power line-down condition. The consolidated power line-down report is reported to a power grid trouble report system.

19 Claims, 8 Drawing Sheets

(56) References Cited

U.S. PATENT DOCUMENTS

| | | |
|---|---|---|
| 7,411,493 B2 | 8/2008 | Smith |
| 7,965,195 B2 | 6/2011 | Deaver, Sr. et al. |
| 7,973,672 B2 | 7/2011 | Holsomback |
| 8,059,011 B2 | 11/2011 | Van et al. |
| 8,138,934 B2 | 3/2012 | Veillette et al. |
| 8,624,727 B2 | 1/2014 | Saign et al. |
| 8,779,927 B2 | 7/2014 | Bell et al. |
| 8,874,071 B2 * | 10/2014 | Sherman ................. H04W 4/90 455/404.2 |
| 9,072,003 B2 | 6/2015 | Kim et al. |
| 9,640,068 B2 * | 5/2017 | Greene ................. H04W 28/14 |
| 9,760,613 B2 * | 9/2017 | Choudhary ......... H04L 41/5009 |
| 9,948,898 B2 * | 4/2018 | Barfield, Jr. ........... G08G 1/052 |
| 9,970,975 B2 | 5/2018 | Bango et al. |
| 10,003,945 B2 | 6/2018 | Papakonstantinou et al. |
| D835,151 S | 12/2018 | Martin et al. |
| 10,262,507 B2 | 4/2019 | Sloo et al. |
| 10,572,962 B2 * | 2/2020 | Rahul U ................. G06Q 10/10 |
| 10,810,695 B2 * | 10/2020 | Knopp .................... H04W 4/90 |
| 10,837,995 B2 * | 11/2020 | Herlong, II ........ G01R 19/2513 |
| 2008/0071717 A1 * | 3/2008 | Nisani .................... G06Q 10/00 706/45 |
| 2009/0251545 A1 * | 10/2009 | Shekarri ................ G06Q 10/00 348/158 |
| 2010/0002847 A1 | 1/2010 | Han |
| 2011/0034146 A1 | 2/2011 | Tognola |
| 2017/0024088 A1 | 1/2017 | La et al. |
| 2018/0025458 A1 | 1/2018 | Swamy |
| 2021/0073692 A1 * | 3/2021 | Saha .................... G06V 10/764 |

OTHER PUBLICATIONS

Matikainen et al, "Remote sensing methods for power line corridor surveys," May 26, 2016, Published by Elsevier B.V on behalf of International Society for Photogrammetry and Remote Sensing, Inc. (ISPRS), pp. 10-31 (Year: 2016).*

Wire Guard App, iRestore, irestoreapp.com, Jul. 28, 2019.

Download OPPDconnect App, Omaha Public Power District, oppd.com, Oct. 28, 2014.

An App for Reporting an Emergency, New York Times, nytimes.com, Jul. 20, 2011.

* cited by examiner

PUBLIC REPORTING OF POWER LINE-DOWN CONDITIONS

FIELD OF THE DISCLOSURE

The present disclosure generally relates to processing reports of utility equipment problems, and more particularly to processing reports of utility equipment problems that are made by members of the public via automated reporting devices.

BACKGROUND

Damage to overhead power lines can cause an active power line to fall to the ground and create a public hazard. Such a fallen power line, whether the line itself is broken or not, is referred to herein as a power line-down condition. Detection of the occurrence and/or location of a power line-down condition by automated means can be difficult. Persons who notice a power line-down condition can call a utility or emergency service operator to provide notification of a suspected power line-down condition. The information provided by persons making such calls often only includes an indication of a general location of the power line-down condition. Further, a customer care center for a utility may receive a high volume of calls during storm events. A large number of calls reporting the same power line-down condition can unnecessarily occupy the phone operators and delay their receiving other emergency calls.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
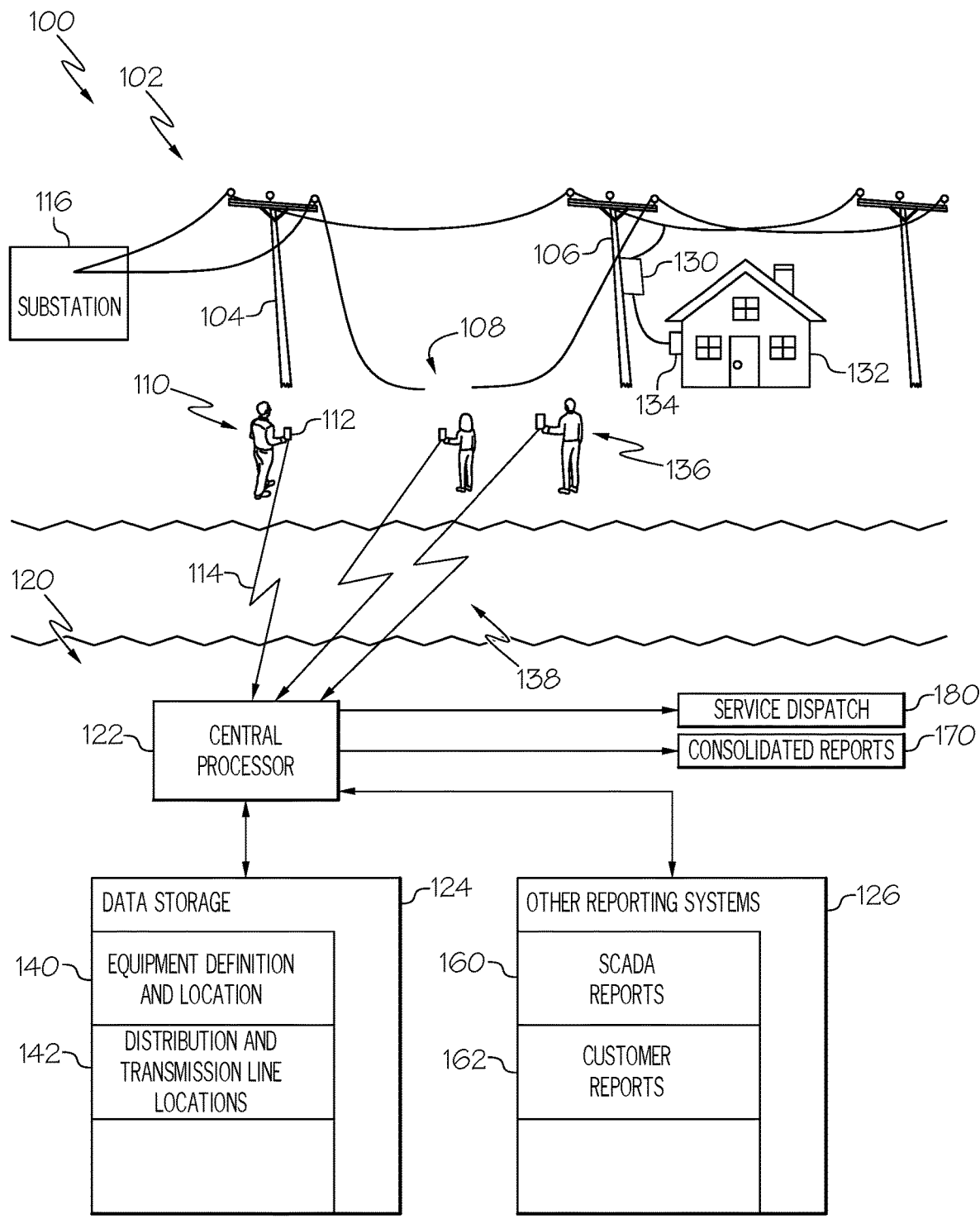
FIG. 1 illustrates a power line-down condition and reporting system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide platforms that allow persons to more conveniently and accurately report power line-down conditions. The below described systems and methods provide efficient and effective processing by back end systems of multiple power line-down reports that might be sent by members of the public to report a single power line-down condition. In an example, the below described systems and methods provide an application on a device, such as a smartphone, that allows a user to easily report an observed power line-down condition to an automated central processor. The report sent to the automated central processor by the application is able to include a determined location of the device at the time of the observation, such as is determined by a GPS receiver of the device. The automated central processor in an example automatically creating a consolidated power line-down report by associating any number of reports that were sent by multiple persons and devices that were all geographically close to one another and that each indicates a power line-down condition. Such a consolidated report is created based on an assumption that multiple user devices that are near each other and reporting power line-down conditions are reporting the same power line-down condition. Automatically associating these multiple reports into one consolidated power line-down report improves the efficiency of responding to the reports by obviating a manual process that would review the many received reports and thereby attempts to identify which reports are related to one another and can thus be consolidated into a single report of the same power line-down condition.

The below described systems and methods provide a person with an application on a device that allows the person to enter a text description of the scene that is included with reports of a power line-down condition that are sent to the automated central processor. The application also allows the person to accumulate and send to the automated central processor other information, such as by capturing and including images, videos, other information, or combinations of these, with the report of the power line-down condition that is sent to the automated central processor.

In an example, the automated central processor is able to perform automated processing of the text description of the scene and of the other information such as images, videos, other information, or combinations of these, that are captured at the scene and sent to the automated central processor along with reports of power line-down conditions. Automated processing of text and other information in an example is able to determine text described conditions by identifying whether the text description, the images, videos, or other information included with the report, or combinations of these, have elements that indicate a dangerous condition. For example, automated processing of the text description is able to detect indications of dangerous conditions such as sparks, fires, standing water observed near the downed power lines, other hazards, or combinations of these by identifying or interpreting words or phrases contained in that text description. Similarly, automated processing of received images, videos, or other information is able to determine image derived conditions at a scene by identifying image components that indicate similar or additional hazards.

In an example, the processing of the text, images, videos, other information, or combinations of these, that are included with received reports of power line-down conditions are able to be performed via processing that incorporates machine learning processes and algorithms that are continually refined and developed over time as more power line-down reports that include text, images, videos, other information, or combinations thereof, are received and processed. The training of such machine learning processes and algorithms is able to be supported by incorporating information obtained during or after resolution of the power line-down condition. For example, continued training of machine learning processes and algorithms to process text, images, videos, other information, or combinations of these, is able to incorporate observations, evaluations, other data, or combinations of these, that are made or obtained by responders, repair crews, other personnel, or combinations of these, during the repair or other resolution of the reported power line-down condition.

In an example, the automated central processor is able to send warnings or other safety messages to provide warnings to the person sending the report. In an example, messages are able to be sent from the central processor to advise the person to stay away from the downed wire and away from any metal structures or standing water near those wires. In some examples, particular warnings to send to the person reporting the power line-down condition are able to be selected based on the automated processing of text, images, other information, or combinations of these, that are included with the received report of the power line-down condition as is discussed above.

As is discussed above, the automated central processor in an example is able to efficiently handle and reduce the multiple reports describing the same power line-down condition that are sent by multiple persons from their devices. The automated central processor in an example is able to create a consolidated power line-down report that associates and combines those multiple reports. In an example, an electric utility prioritizing the dispatch of repair crews or other remedial actions is able to better evaluate the extent of damages to the electrical grid by consolidating the multiple reports submitted by various members of the public that all refer to the same power line-down condition.

In some examples, the central processor determines which reports of power lines down conditions are related based on the location of the reporting device that is contained in each of the received reports. In some examples, reports with locations that are within a certain threshold distance of each other are determined to be associated with one another and all of those reports are consolidated into one power line-down report. In an example, a power line or other electric grid asset that is nearest to the locations included in all of the reports that are determined to be associated is identified as the downed power line that has the power line-down condition.

In an example, the central processor is able to identify one or more electric power grid devices that are physically close to the site of the reported line-down condition or that are electrically connected to the downed power line. Examples of such electric grid devices include power distribution transformers, substations, reclosers, other devices, or combinations of these. In some examples, some electric grid devices have automated monitoring and reporting equipment, such as Supervisory Control And Data Acquisition (SCADA) systems, to report problems to a central monitoring system. In an example, if a problem has been reported with such an electric grid device, such as if a trouble ticket already exists for that device, the power line-down condition is able to be combined with that trouble ticket or other trouble report for that device so that more complete data regarding the incident is available to maintenance personnel.

In an example, the central processor is also able to determine if a power outage exists in the area. In various examples, the existence of a power outage is able to be determined based on, for example, reports from automated monitoring equipment, such as Supervisory Control And Data Acquisition (SCADA) equipment or Advanced Metering Infrastructure (AMI) equipment, by customers reporting power outages, by other techniques, or by combinations of these. The central processor in an example is able to combine the reported power line-down condition with the determined power outage in order to provide a more complete picture of the impact of the reported power line-down condition and aid in the evaluation of the severity of the condition by repair dispatch systems. In some examples, if no power outage for customers receiving power through a power line that has been reported as being down, the central processor is able to create a trouble report, such as a repair ticket, that indicates a power outage for customers receiving power through power line that has been reported as being down.

FIG. 1 illustrates a power line-down condition and reporting system 100, according to an example. The power line-down condition and reporting system 100 depicts a distribution power line 102 and a substation 116 is shown that provides power to the distribution power line 102 adjacent to a first pole 104. A pole transformer 130 is mounted on a second pole 106 and provides electric power to customers, such as to house 132 via a smart meter 134 located at the house 132. The illustrated distribution power line 102 is shown to have a line break 108 between the first pole 104 and the second pole 106, which is an example of a power line-down condition. The line-down condition at the line break 108 is between the substation 116 and the customer in the illustrated house 132. The power line-down condition and reporting system 100 depicts only a few poles for power line 102 for conciseness. In general, distribution power lines extend for long distances and are supported by a series of many poles.

The line-down condition and reporting system 100 depicts a person 110 with a smartphone 112 that is near the line break 108. As discussed in further detail below, the person 110 is able to use the smartphone 112 in an example to automatically send a notification of the line-down condition to a central processing center 120 based on a small number of user actions. Such a notification of the line-down condition in an example is referred to as a power line-down report and is able to include, among other information, the location of the smartphone 112 at the time of the notification. In an example, the location of the smartphone 112 is automatically determined by a GPS receiver or other equipment within the smartphone 112 in order to be included into the power line-down report.

The person 110 in an example is able to enter textual descriptions of the scene near the line break 108, take pictures of the line break 108 and the nearby area, capture videos of the area, accumulate other information, or combinations of these and send such information regarding the power line-down condition to the central processing center 120 either as part of a power line-down report or as a separate transmission. In various examples, the person 110 is able to decide which information to accumulate, such as which scenes to capture in images or videos, what aspects of the scene to describe in text, what other information to capture and send, or combinations of these. In some examples, the smartphone 112 is able to receive requests from the central processing center 120 that indicate information that the person 110 should acquire and send back to the central processing center 120. In general, information accumulated by the person 110 is able to be communicated to the central processing center 120 by any suitable technique.

The line-down condition and reporting system 100 also depicts a number of other persons 136 who are located near the line break 108. In the illustrated example, the number of other persons 136 each has a smartphone (not shown) and they each send their own other power line-down reports 138 of the same line break 108 to the central processing center 120 as separate power line-down reports. In various examples, many persons will see the line break 108 and each will send their own power line-down report to the central processing center 120. The smartphones held by each of the number of other persons 136 in this example are each able to allow its user to accumulate information as is described above with regards to the smartphone 112 and send that accumulated information to the central processing center 120 by any suitable technique.

The smartphone 112 of the person 110 as well as the smartphones of the number of other persons 136 in an example are all able to receive safety instructions or other information that is to be displayed to the person holding the smartphone, such as person 110 and each of the number of other persons 136. For example, the smartphone may receive and display notifications instructing the person 110 to stay away from the downed lines or any structures or water. The central processing center 120 is also able to send instructions to the smartphone that are to be displayed the person 110 to perform actions such as call emergency services (such as an emergency number like 911, call an ambulance or fire department), move to a different location in a particular direction from the person's present location and farther away from the line break, take other actions, or combination of these.

The line-down condition and reporting system 100 includes a central processing center 120 that receives line-down reports from various persons and processes those reports as is described below. The line-down condition and reporting system 100 depicts the smartphone 112 sending a power line-down report 114 and smartphones of the number of other persons 136 sending other power line-down reports 138 to a central processor 122 at the central processing center 120. In an example, the power line-down report 114 includes one or more of the geographic location of the smartphone 112, a textual description of the scene near the line break 108, pictures and videos of the line break 108 and surrounding areas, other information, or combinations of these.

The central processing center 120 includes a data storage 124 that in an example is in communications with and maintained by the central processor 120. The data storage 124 is shown to include data that supports identification of electric utility equipment that is near the location of a reported power line-down condition, and data that allows determining which electric utility equipment would be affected by a power line-down condition at a particular location.

The illustrated data storage 124 includes an equipment definition and location storage 140 and a distribution and transmission line locations storage 142. As is described in further detail below, the central processor 120 is able to compare locations included with power line-down reports to locations stored within the distribution and transmission line locations storage 142. The central processor 120 in an example is able to identify which power line has a line break 108 and thus a power line-down condition based on comparing the location reported with received power line-down reports to the stored locations of distribution and transmission lines as are stored in the distribution and transmission line location storage 142.

The central processing center 120 includes other reporting systems 126. The other reporting systems 126 in an example includes other systems operated by or accessed by an electric utility to monitor the operations and conditions of electric utility equipment and to report on abnormalities or other problems with the monitored equipment. The other reporting system 126 includes a Supervisory Control And Data Acquisition (SCADA) reporting system 160 and a customer reports system 162.

In an example, the central processor 122 is able to determine the location of the line break 108 based on power line-down reports sent by one or more devices near the power line-down condition. The central processor is then able to determine, as is described below, the location of equipment that is connected to the power line with the line break 108. The central processor 122 in an example is then able to determine if any the equipment that is connected to the power line with the line break 108 has a problem reported by one or more of the other reporting systems 126. For example, if a SCADA system reports a problem with the substation 116 that provides power to the power line with the line break 108, the central processor 122 is able to associate the SCADA system report for that substation with the received power line-down report in order to provide more information on the incidents.

Further, in various examples, it may be determined that one or more customers that receive electric power from the line with the line break 108, such as a customer in house 132, have lost their power due to the line break 108 and the power line-down condition. This loss of power by customers will result in outage reports for those customers. In an example, a person in house 132, as well as persons in other houses, may have called the electric utility to report that their power is out and an outage report will be generated. Further, automatically reporting power meters, such as smart meter 135 that is part of the Advance Metering Infrastructure (AMI), are able to report that power is out for customers receiving power from the power line with the line break 108 and an outage report is generated based thereon.

In an example, the central processor 120 is able to associate outage reports with power line-down reports for power lines providing power to areas that have had outages reported. The central processor 120 is also able to associate power line-down reports with SCADA reports for equipment that is affected by power lines that are the subject of those power line-down reports.

In an example, the central processor 122 creates a consolidated issue report that consolidates the outage reports, SCADA reports, other reports, and power line-down reports into one trouble report that more clearly and definitively describes a problem with the power grid. The central processor 122 in an example stores the created consolidated issue report into a consolidated report repository 170.

Based on the consolidated issue reports from a number of independent problems that might have occurred in an electrical utility system, the central processor 122 in an example is able to better evaluate and prioritize these independent problems once the many trouble reports for the incidents associated with each independent problem are consolidated.

The central processor 122 in an example is able to provide information according to the improved evaluation and prioritization of the independent problems that have occurred with the electric utility equipment to a service dispatch component 180. The service dispatch component 180 is then able to more efficiently and effectively dispatch repair crews to address the independent issues in a manner that improves overall electric power restoration by the electric utility.

Figure 2:
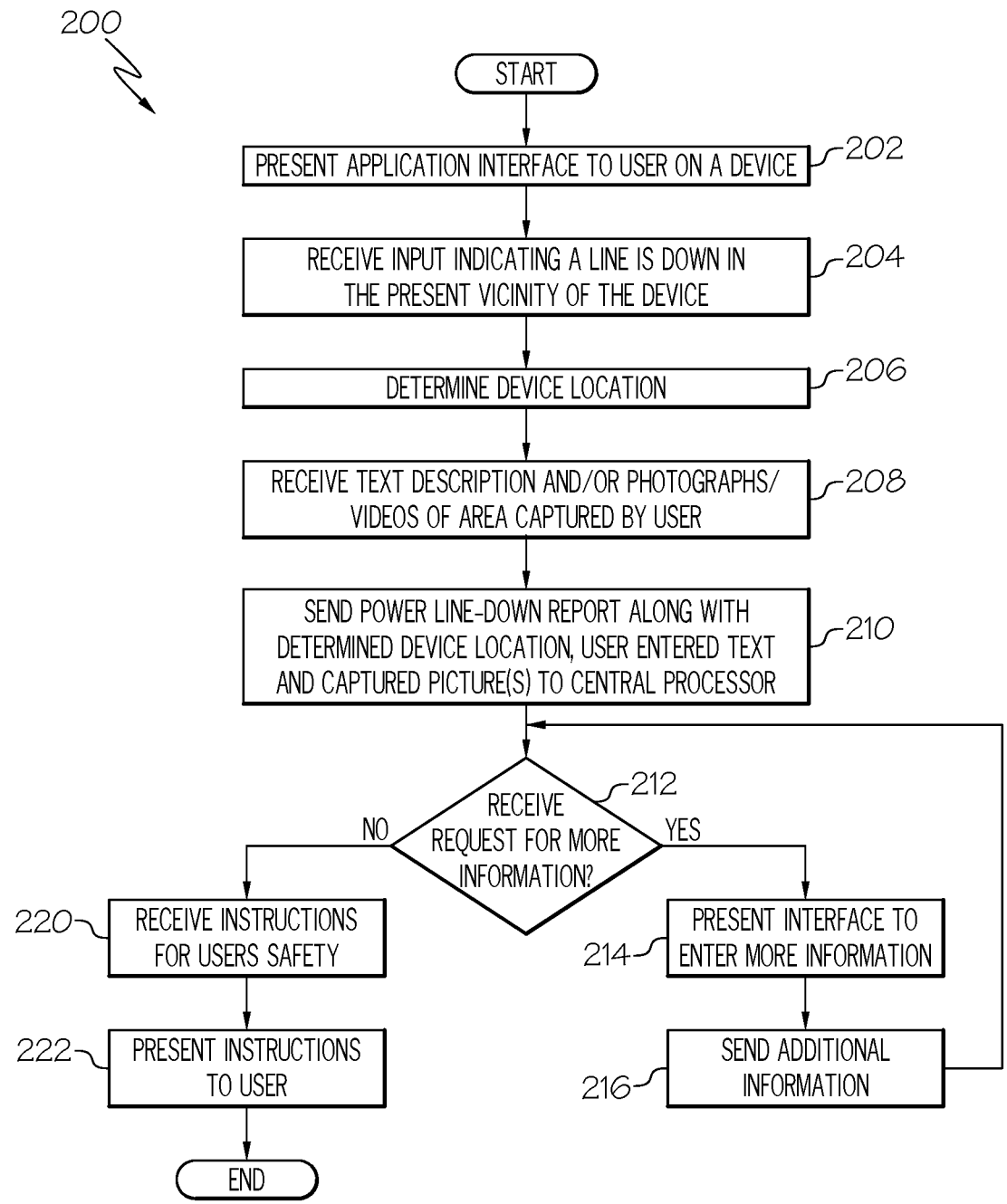
FIG. 2 illustrates a power line-down reporting process, according to an example.

FIG. 2 illustrates a power line-down reporting process 200, according to an example. The power line-down reporting process 200 is an example of a process performed by a smartphone 112 that allows a user to create and send a power line-down report to a central processing center 120.

The power line-down reporting process 200 presents, at 202, an application interface to a user of a device. In an example, the application interface is presented on a screen of smartphone 112 described above. The application interface in an example includes one or more presentations that allow a user to initiate sending of a power line-down report, allows the user to enter a textual description, capture images or videos of the scene around the power line-down condition, accumulate other information, or combinations of these. Examples of displays that are presented as part of the application interface are discussed in further detail below.

The power line-down reporting process 200 receives, at 204, input from a user indicating a line is down in the present vicinity of the device. Examples of such an input include an input to cause a power line-down reporting interface to be presented to the user.

The power line-down reporting process 200 determines, at 206, a present location of the device. In an example, the present location is determined by a GPS receiver within the device performing the power line-down reporting process 200.

The power line-down reporting process 200 receives, at 208, information such as one or more of a text description, images capturing scenes around the power line-down condition, videos capturing scenes near the power line-down condition, other information, or combinations of these. In some examples, a person 110 is able to enter text information using a keyboard or speech recognition processing of the smartphone 112, capture images, videos, or both, using a camera of the smartphone 112, capture other information, or combinations of these.

The power line-down reporting process 200 sends, at 210, a power line-down report that includes the determined device location, user entered text, images, videos, other information, or combinations of these, to a central processor. In an example, the person 110 causes the smartphone 112 to send the report with text, images, videos, other information, or combinations of these, to the central processing center 120.

The power line-down reporting process 200 determines, at 212, if a request has been received for more information. If such a request has been received, instructions to enter or obtain more information are presented, at 214. In an example, the instructions are presented on a display of the smartphone 112 along with user interface elements that allow the user to enter the requested information. The additional information is then sent, at 216, to the central processing center 120. In some examples, the additional information is entered by the user via user interface elements presented on the screen of the smartphone 112, are automatically obtained by processing of the smartphone 112, obtained via any suitable technique, or combinations of these. The power line-down reporting process 200 then returns to determining, at 212, if a request has been received for more information.

If a request for more information has not been received, instructions for the user's safety in an example are received, at 220. The instructions are presented to the user, at 222, such as on a display of the smartphone 112, via audio or other outputs of the smartphone 112, by any suitable technique, or by combinations of these. The power line-down reporting process 200 then ends.

Figure 3:
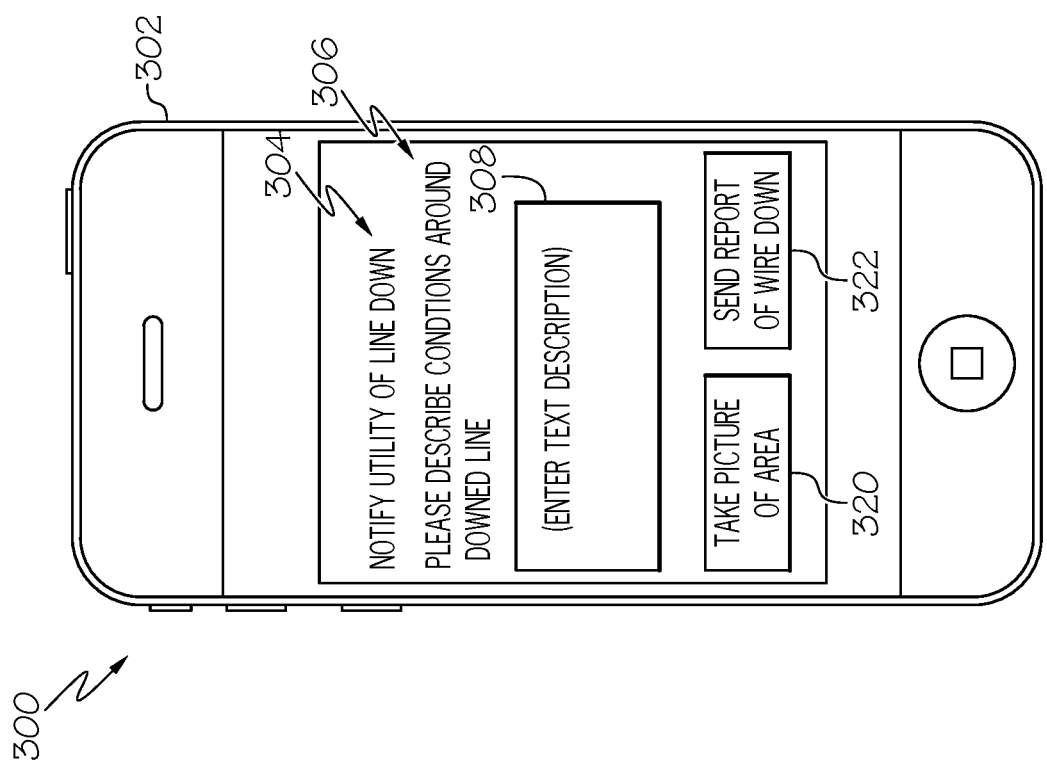
FIG. 3 illustrates an initial line-down reporting screen, according to an example.

FIG. 3 illustrates an initial line-down reporting screen 300, according to an example. The initial line-down reporting screen 300 depicts an example of initial application interface 302 that is displayed to a user of a smartphone 112 when the user starts a reporting process for a power down line condition. In an example, the initial line-down reporting screen 300 is presented when a user opens an app on the smartphone 112 to report a line-down condition.

The initial line-down reporting screen 300 includes a title that indicates "NOTIFY UTILITY OF LINE-DOWN" and an instruction line 306 that states "PLEASE DESCRIBE CONDITIONS AROUND DOWNED LINE." In further examples, the initial line-down reporting screen 300 is able to include further instructions to the user, allow the user to select user interface elements that cause more detailed instructions to be presented, provide further information to the user, or combinations of these.

The initial line-down reporting screen 300 has a text entry field 308 that allows the user to enter text describing conditions as instructed by the instruction line 306. In an example, the user will start the app on his or her smartphone 112 that presents the initial line-down reporting screen 300 and the user will enter text into the text entry field 308 that describes the scene around the power line-down condition.

The initial line-down reporting screen 300 includes a TAKE PICTURE OF AREA user interface element 320 and a SEND REPORT OF WIRE DOWN user interface element 322. In an example, when the user selects the TAKE PICTURE OF AREA user interface element 320, another user interface is presented that allows a user to capture images of the area near the power line-down condition. In an example, selecting the TAKE PICTURE OF AREA user interface element 320 causes the application to provide user interface elements that allow a user to, capture, select, discard, or otherwise manipulate, perform other functions, or combinations of these with images of the area that are captured by a camera of the smartphone 112. In further examples, user interface facilities are provided to allow the user to capture videos of the area as well as obtain other information that can be sent back to the central processing center 120 to further assist in assessing the power line-down condition being reported.

In an example, the user is able to select the SEND REPORT OF WIRE DOWN user interface element 322 when the report is ready to be sent to the central processing center 120. In an example, the user will select the SEND REPORT OF WIRE DOWN user interface element 322 is selected after a text description of the scene around the power line-down condition has been entered into the text entry field 308 and any images, videos, or other information the user wants to collect and send with the report have been assembled and provided to the application for including into the report. Selecting the SEND REPORT OF WIRE DOWN user interface element 322 in an example causes the power line-down report 114 to be sent from the smartphone 112 to the central processing center 120.

Figure 4:
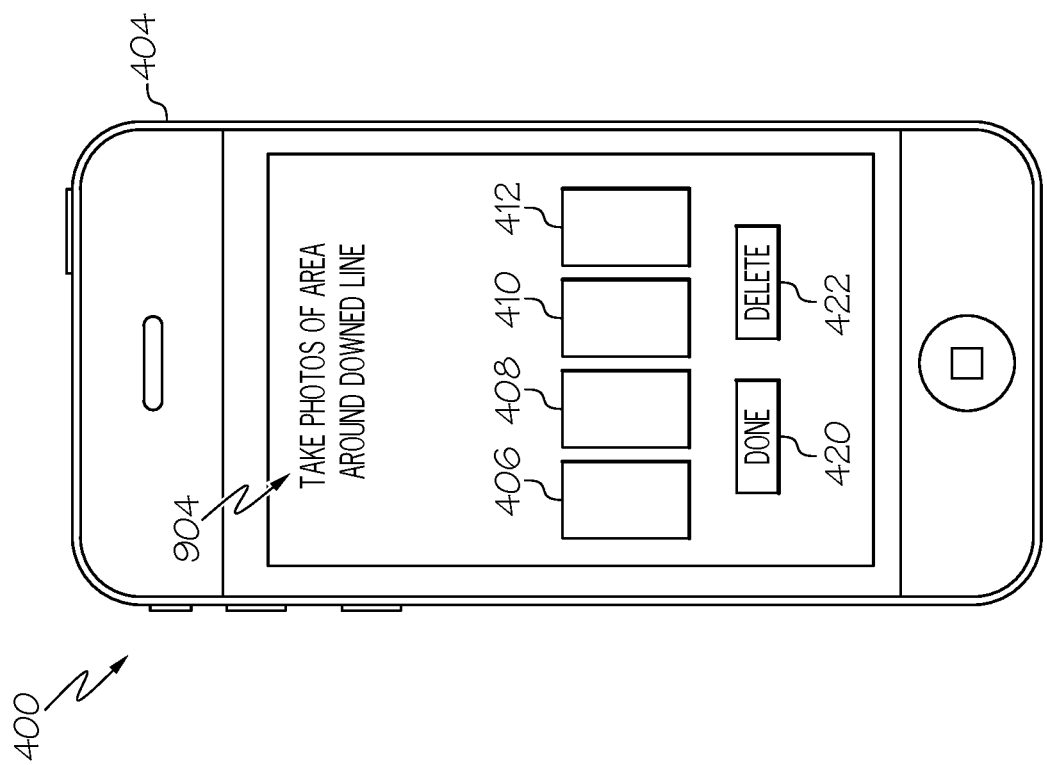
FIG. 4 illustrates an image capture screen, according to an example.

FIG. 4 illustrates an image capture screen 400, according to an example. The image capture screen 400 is an example of an image capture user interface display 402 that allows a user to capture images that are to be sent with a power line-down report. In an example, the image capture screen 400 is presented after the user selects the TAKE PICTURE OF AREA user interface element 320.

The depicted image capture screen 400 includes a title 404 that includes instructions stating TAKE PICTURE OF AREA AROUND DOWNED LINE. The image capture screen 400 includes four image display areas, a first image display area 406, a second image display area 408, a third image display area 410, and a fourth image display area 412. In an example, a user is able to capture images by tapping a particular element of the application user interface, such as one of the image display areas, and a camera of the device, such as a camera of smartphone 112, will capture an image and display it in that image display area.

A DELETE button 422 allows a user to delete an image that has been captured and is presented in one of the image display areas. In an example, a user is able to select an image, such as by tapping the image display area in which that image is presented, and then pressing the DELETE button 422.

A DONE button 420 allows a user to end image capturing and return to other parts of the app. In an example, selecting the DONE button 420 causes processing of the application returns control of the application to another function, such as the initial line-down reporting screen 300 or any other screen or function.

In further examples, similar application user interfaces are presented to allow a user to capture videos of the scenes around the power line-down condition. User interfaces are also able to be presented that allow the user to collect any type of information that can then be sent to the central control center 120.

Figure 5:
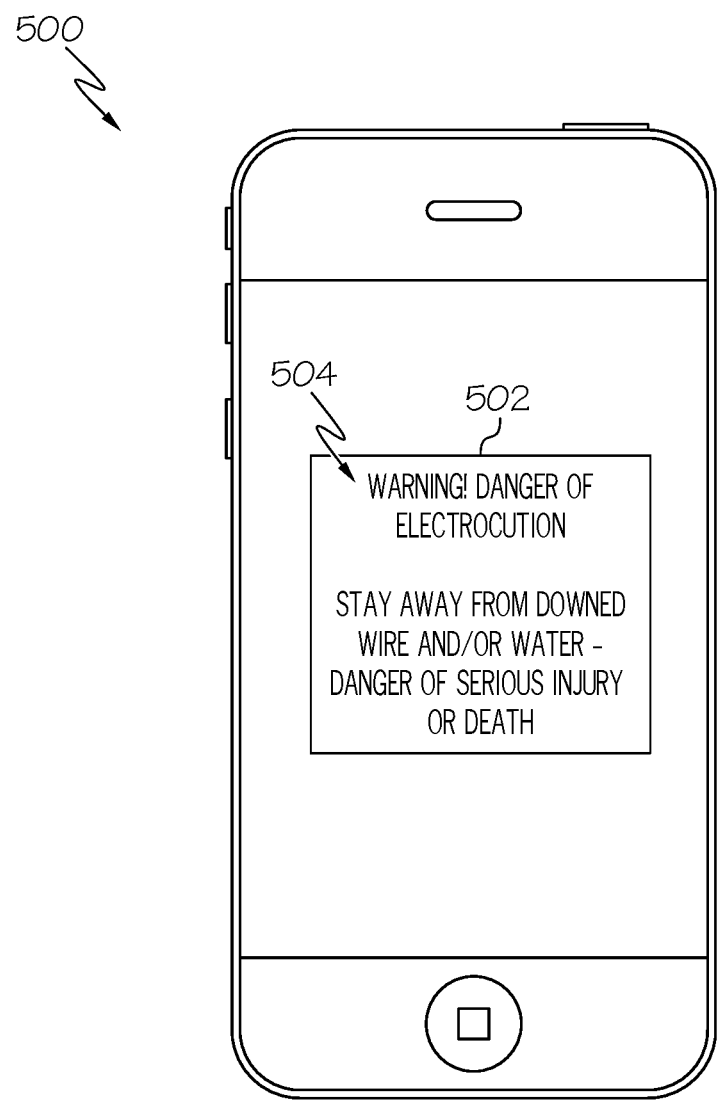
FIG. 5 illustrates a user safety warning information screen, according to an example.

FIG. 5 illustrates a user safety warning information screen 500, according to an example. The user safety warning information screen 500 is an example of a safety information display 502 that is presented to a user to with instructions to avoid the dangers present at the scene of a line-down condition. In an example, the presented instructions are sent from the central processing center 120 to the smartphone 112 and are automatically displayed to the user.

The illustrated user safety warning information screen 500 presents a message WARNING! DANGER OF ELECTROCUTION STAY AWAY FROM DOWNED WIRE AND/OR WATER—DANGER OF SEROUS INJURY OR DEATH. In various examples, the message displayed on the user safety warning information screen 500 is able to be based on particular hazards that may be present at the site of the power line-down condition where those hazards were identified based on analysis of text, images, videos, other information, or combinations of these, that were sent to the central processing center 120. In some examples, the hazards are able to be identified based on information sent by the user to which the user safety warning information screen 500 is being presented. In some examples, the hazards can be identified based on information, such as text description, images, videos, other information, or combinations of these, that was sent to the central processing center by other persons who reported the same power line-down condition.

Figure 6:
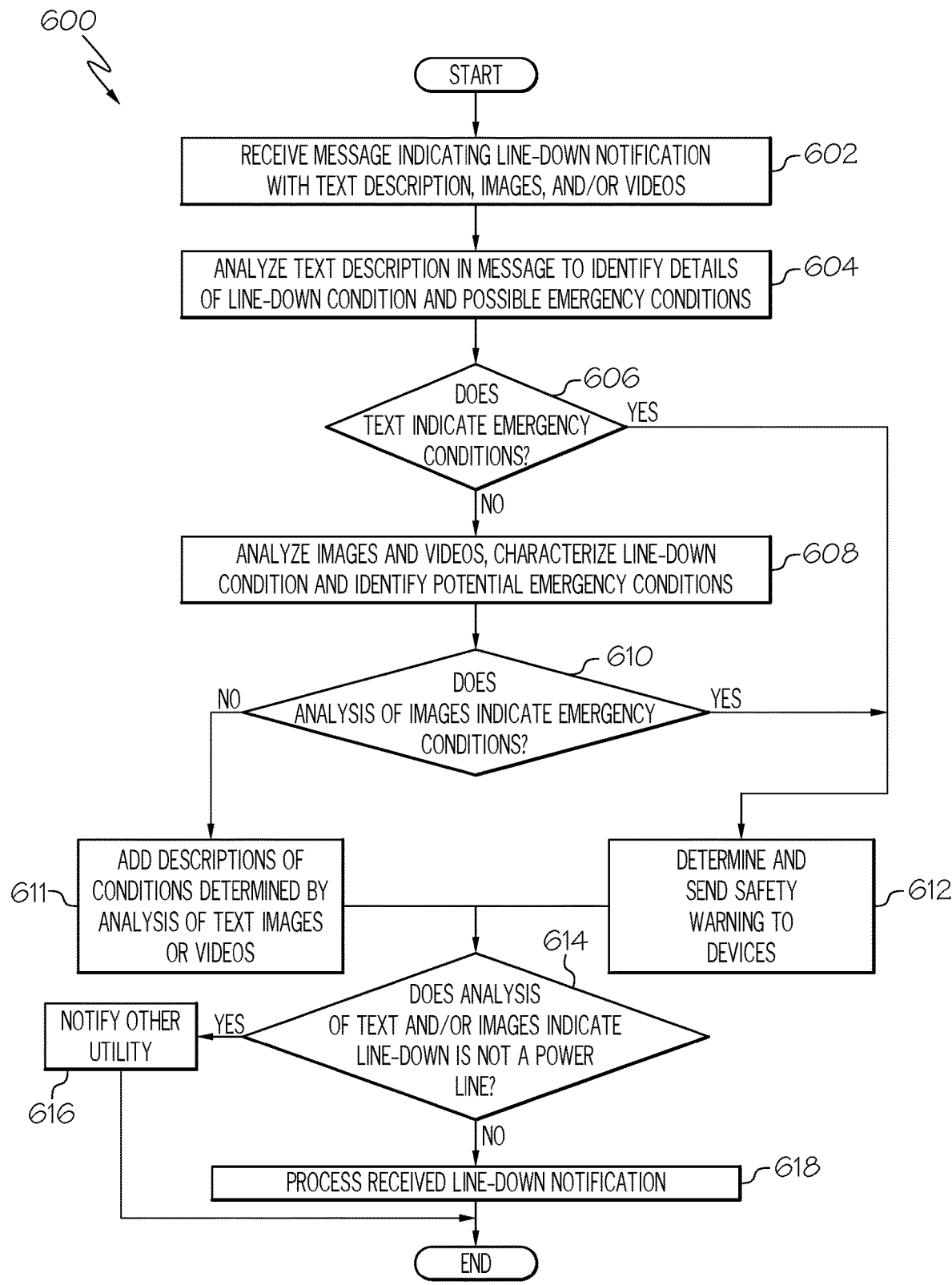
FIG. 6 illustrates a power line-down report analysis process, according to an example.

FIG. 6 illustrates a power line-down report analysis process 600, according to an example. The power line-down report analysis process 600 in an example is performed by the central processor 122 to initially process received power line-down reports.

The power line-down report analysis process 600 receives, at 602, a message indicating a line-down notification with at one or more of a text description of the surrounding scene, images, videos, or combinations of these. In some examples, this message is received from the smartphone 112 or from a smartphone operated by one of the number of other persons 136. This is an example of receiving a plurality of power line-down reports where each respective power line-down report in the plurality of power line-down reports is sent by a different respective device operated by different respective users and comprises an indication of a location of the respective device.

The power line-down report analysis process 600 analyzes, at 604, the text description in the received message. In an example this analysis identifies details of the line-down condition, possibilities of emergency conditions in the vicinity of the line-down condition, other aspects of the scene, or combinations of these. In some examples, this analysis is performed at least in part by a machine learning process. This is an example of analyzing, via automated text recognition processing, the text descriptions in each of the at least some power line-down reports to recognize text scene descriptions contained in the text descriptions.

In an example, the machine learning process is able to be incrementally trained so as to refine the processing used to analyze the text description contained in received power line-down reports. In an example, the machine learning process is able to be incrementally trained based on correlating text messages contained in power line-down reports that reported previously occurring power line-down conditions with descriptions of conditions at the scene of those previously occurring power line-down condition as were reported by, for example, repair personnel or others arriving at that previously power line-down condition. Performing such incremental training is an example of: receiving, prior to receiving the plurality of power line-down reports, a plurality of previously received power line-down reports reporting prior power line-down conditions, the previously received power line-down reports comprising text descriptions of scenes near the prior power line-down conditions; receiving, from repair personnel sent to repair the prior power line-down conditions, information describing conditions at the scenes near the prior power line-down conditions; incrementally training, prior to receiving the plurality of power line-down reports and based on the text descriptions of scenes near the prior power line-down condition and the information describing conditions at the scenes near the prior power line-down conditions, the machine learning algorithm to better recognize text descriptions of scenes, where the analyzing comprises analyzing the text descriptions with the machine learning algorithm that has been trained by the incrementally training.

The power line-down report analysis process 600 determines, at 606, whether the text indicates an emergency condition. If no emergency condition is determined to exist, images, videos, other information, or combinations of these that were received in the notification message are analyzed, at 608, to identify possible emergency conditions in the vicinity of the line-down condition, other aspects of the scene, or combinations of these. In some examples, this analysis is performed at least in part by a machine learning process that refines the processing used to analyze the images, videos, other information, or combinations of these based on correlating identifications made by processing the images, videos, other information, or combinations of these that were contained in power line-down reports that reported previously occurring power line-down conditions with descriptions of conditions at the scene of those previously occurring power line-down condition as were reported by, for example, repair personnel or others arriving at that previously power line-down condition.

The power line-down report analysis process 600 determines, at 610, whether the analysis of images, videos, other information, or combinations of these indicates an emergency condition. If an emergency condition is identified based on either analyses if text, at 606, or analysis of images, videos, other information, or combinations of these, at 610, safety warnings are determined and sent to devices in the vicinity of the downed power line. In an example, the safety warning is determined and sent to the device that sent the text description, image, video, other data, or combinations of these that indicated the emergency condition. In some examples, such determined safety warnings are sent to other devices that are in the area of the device that sent the text, images, videos, other data, or combinations that indicated the emergency condition. In an example, the analyses performed are able to identify a particular type of emergency, such as fire or medical emergencies, and notify the appropriate authorities.

The power line-down report analysis process 600 determines, at 614, whether the analysis of text, images, videos, other information, or combinations of these, indicate that the downed line is not a power line. For example, a downed line is able to be a telephone line or a cable television line. Such analyses are able to be made by manual inspection of the text, images, videos, or other information, as well as analyses that are at least partially performed by machine learning algorithms. If it is determined that the downed line is not a power line, at least one other utility is notified, at 616, and the power line-down report analysis process 600 ends.

Returning to the determination, at 614, if it is determined that the downed line is a power line, the received wire down notification message is processed, at 618. An example of processing of received wire down notification messages is described in further detail below. The power line-down report analysis process 600 ends.

Figure 7:
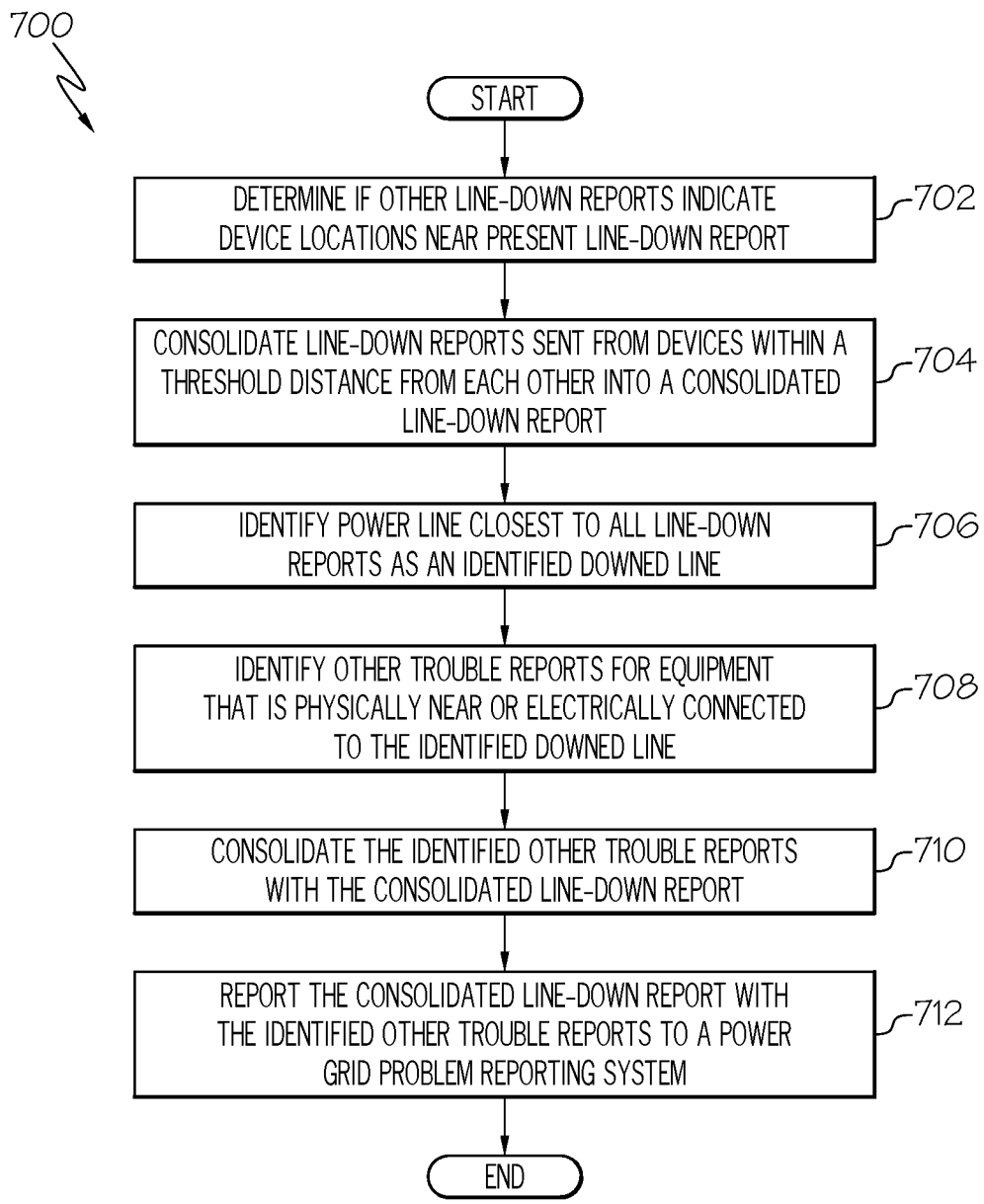
FIG. 7 illustrates a power line-down report message consolidation process, according to an example.

FIG. 7 illustrates a power line-down report message consolidation process 700, according to an example. The power line-down report message consolidation process 700 is an example of a process performed by the central processor 122 to consolidate power line-down messages that are likely to be associated with the same power line-down event, and to also consolidate a power line-down condition with trouble reports for other electric utility equipment that may be related to the power line-down event. The power line-down report message consolidation process 700 is an example of the power line-down report analysis process 600 discussed above. As described above, power line-down report analysis process 600 includes receiving a plurality of power line-down reports where each respective power line-down report in the plurality of power line-down reports is sent by a different respective device operated by different respective users and comprises an indication of a location of the respective device.

The power line-down report message consolidation process 700 determines, at 702, if other line-down reports indicate the location of the reporting device near the line-down report being processed. This determination is an example of determining which power line-down reports have locations that are within a defined distance threshold of each other. In some examples, this includes processing to determine, based on the respective indications of the respective location of the respective device in each power line-down report, a related set of power line-down reports that are all likely to be reporting a particular power line-down condition.

The power line-down report message consolidation process 700 consolidates, at 704, line-down reports sent from devices within a threshold distance from each other into a consolidated power line-down report. This consolidation is an example of creating, based on the related set of power line-down reports, a consolidated power line-down report comprising data associated with the particular power line-down condition.

A power line closest to all of the consolidated line-down reports is identified as an identified downed line, at 706. In an example, this identification include comparing the location indicated in the received power line-down reports to locations of power lines as defined within the distribution and transmission line locations storage 142 discussed above. This identification is an example of determining, based on device locations indicted in the related set of power line-down reports and based on accessing power line location information, a location of the particular power line-down condition that corresponds to a location of a power line that is closest to all locations within each of the related set of power line-down reports.

Other trouble reports for equipment that is physically near or electrically connected to the identified downed line is identified at 708. In an example, trouble reports contained in the SCADA reporting system 160 or the customer reports system 162 are combined with location data contained in the equipment definition and location storage 140 to determine which equipment is physically near or electrically connected to the identified power line. This identification is an example of identifying a trouble report associated with a reported electric grid equipment that is physically near the location of the power line-down condition or that is electrically connected to the downed power line.

The identified other trouble reports are consolidated with the consolidated line-down indecent report, at 710. This consolidation is an example of associating, based on the identifying, the reported electric grid equipment with the consolidated power line-down report.

The consolidated line-down report with the identified other trouble reports in an example is reported, at 712, to a power grid trouble reporting system. The power line-down report message consolidation process 700 then ends.

Figure 8:
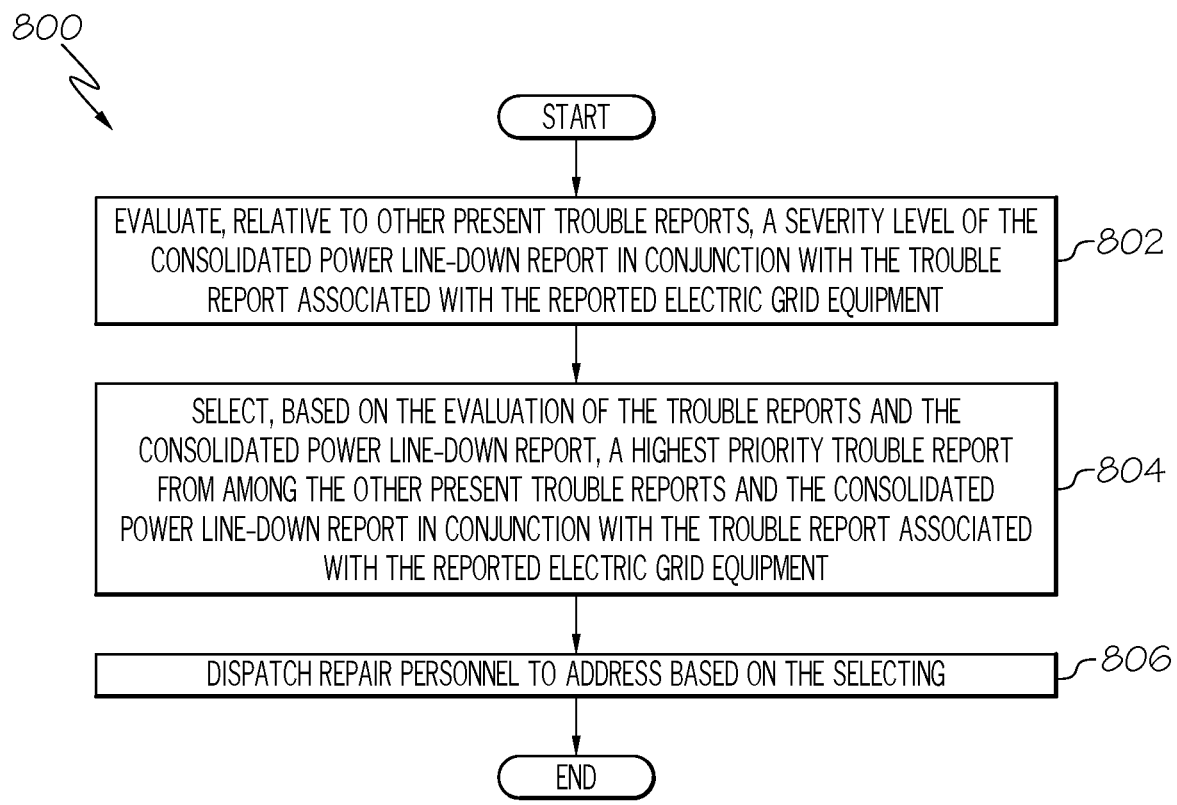
FIG. 8 illustrates a power grid problem prioritization process, according to an example.

FIG. 8 illustrates a power grid problem prioritization process 800, according to an example. The power grid problem prioritization process 800 in an example is performed by the central processor 122 after performing the power line-down report message consolidation process 700.

The power grid problem prioritization process 800 begins, at 802, by evaluating, relative to other present trouble reports, a severity level of the consolidated power line-down report in conjunction with the trouble report associated with the reported electric grid equipment. The comparative evaluation of the severity of various trouble reports with respect to one another is able to be performed based on any suitable technique or criteria.

The power grid problem prioritization process 800 selects, at 804 based on the above based on the above comparative evaluation of the trouble reports and the consolidated power line-down report, a highest priority trouble report from among the other present trouble reports and the consolidated power line-down report in conjunction with the trouble report associated with the reported electric grid equipment. Selection of the highest priority trouble report is able to be based on any suitable criteria for comparative evaluation of the various trouble reports.

The based on the evaluation of the trouble reports and the consolidated power line-down report dispatches, at 806, repair personnel to address based on the selection of the highest priority trouble report. The based on the evaluation of the trouble reports and the consolidated power line-down report then ends.

The present example operates to more effectively evaluate conditions and issues that result from a downed power line and more efficiently evaluate the severity of the downed power line in conjunction with other trouble reports that are related to the downed power line. In an example, the multiple reports sent by a number of persons reporting the same downed power line to a central processor are combined into a single consolidated line-down report and that consolidated line-down report is combined with related trouble reports that, for example, indicate problems reported with equipment connected to the downed power line. For example, trouble reports such as SCADA reports, AMI or customer reports of power outages, other reports, or combinations of these, that concern equipment or customers connected to the downed power line are combined with one another to provide a more comprehensive picture of the extent of the problem caused by the downed power line.

Figure 9:
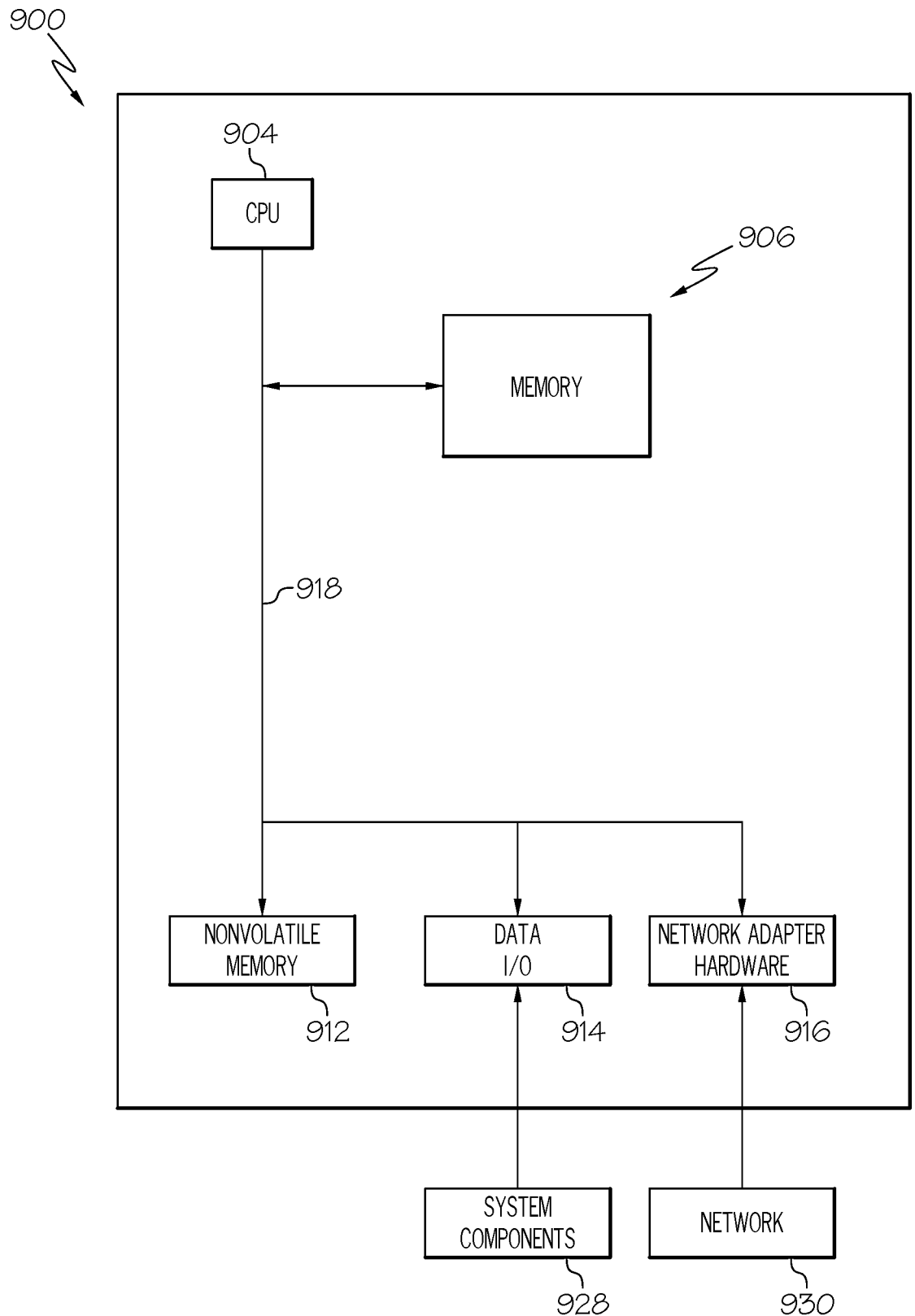
FIG. 9 illustrates a block diagram illustrating a processor, according to an example.

FIG. 9 illustrates a block diagram illustrating a processor 900 according to an example. The processor 900 is an example of a processing subsystem that is able to perform any of the above described processing operations, control operations, other operations, or combinations of these.

The processor 900 in this example includes a CPU 904 that is communicatively connected to a main memory 906 (e.g., volatile memory), a non-volatile memory 912 to support processing operations. The CPU is further communicatively coupled to a network adapter hardware 916 to support input and output communications with external computing systems such as through the illustrated network 930.

The processor 900 further includes a data input/output (I/O) processor 914 that is able to be adapted to communicate with any type of equipment, such as the illustrated system components 928. The data input/output (I/O) processor in various examples is able to be configured to support any type of data communications connections including present day analog and/or digital techniques or via a future communications mechanism. A system bus 918 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for processing a plurality of power line-down reports, the method comprising:
  receiving a plurality of power line-down reports where each respective power line-down report in the plurality of power line-down reports is sent by a different respective device operated by different respective users and comprises a respective indication of a respective location of the respective device,
  wherein at least some power line-down reports within the plurality of power line-down reports comprise at least one of an image or a video of a scene comprising a view of a particular power line-down condition;

analyzing, via automated image recognition processing, the at least one of the image or the video in each of the at least some power line-down reports to identify a particular power line-down report that comprises an image or a video of a downed line that is not a power line;

determining, based on the respective indications of the respective location of the respective device in each power line-down report except for the particular power line down report, a related set of power line-down reports that are all likely to be reporting the particular power line-down condition;

determining, based on comparing the respective location indicated in each of the power line down reports in the related set of power line down reports to stored geographic locations of power lines, a line down location corresponding to a geographic location of a power line that is close to locations within the related set of power line down reports;

identifying, based on searching a set of trouble reports other than power line down reports, a reported electric grid equipment that has a trouble report and that is physically near and separated from the location of the particular power line-down condition or that is electrically connected to a downed power line at the location of the particular power line-down condition;

creating, based on the related set of power line-down reports, a consolidated power line-down report comprising:

data associated with the particular power line-down condition;

and the trouble report for the reported electric grid equipment that is physically near and separated from the location of the particular power line-down condition or that is electrically connected to a downed power line at the location of the particular power line-down condition, wherein the consolidated power line-down report indicates the line down location indicated as a location of the power line-down condition; and reporting the consolidated power line-down report to a power grid trouble report system.

2. The method of claim 1, further comprising:

evaluating, relative to other present trouble reports, a severity level of the consolidated power line-down report in conjunction with the trouble report associated with the reported electric grid equipment;

selecting, based on the evaluating, a highest priority trouble report from among the other present trouble reports and the consolidated power line-down report in conjunction with the trouble report associated with the reported electric grid equipment; and dispatching repair personnel to address based on the selecting.

3. The method of claim 1, wherein at least some power line-down reports within the plurality of power line-down reports comprise text descriptions of a scene near the particular power line-down condition, and where the method further comprises:

analyzing, via automated text recognition processing, the text descriptions in each of the at least some power line-down reports to recognize text scene descriptions contained in the text descriptions;

determining text described conditions at the scene of the particular power line-down condition; and adding the text described conditions to the consolidated power line-down report.

4. The method of claim 3, further comprising:

determining, based on analysis of the text descriptions and the text scene description, a safety warning to avoid a hazard within the text scene description to provide to a respective user of a respective device that a respective power line-down report within the related set of power line-down reports; and sending the safety warning to at least some devices that sent power line-down reports within the related set of power line-down reports.

5. The method of claim 3, where the text recognition processing comprises a machine learning algorithm, and where the method further comprises:

receiving, prior to receiving the plurality of power line-down reports, a plurality of previously received power line-down reports reporting prior power line-down conditions, the previously received power line-down reports comprising text descriptions of scenes near the prior power line-down conditions;

receiving, from repair personnel sent to repair the prior power line-down conditions, information describing conditions at the scenes near the prior power line-down conditions; and incrementally training, prior to receiving the plurality of power line-down reports and based on the text descriptions of scenes near the prior power line-down condition and the information describing conditions at the scenes near the prior power line-down conditions, the machine learning algorithm to better recognize text descriptions of scenes, where the analyzing comprises analyzing the text descriptions with the machine learning algorithm that has been trained by the incrementally training.

6. The method of claim 1, where the power line down location comprises a location of a power line that is closest to all locations within each of the related set of power line-down reports.

7. The method of claim 1, wherein at least some power line-down reports within the plurality of power line-down reports comprise text descriptions of a scene near the particular power line-down condition, and where the method further comprises:

analyzing, via automated text recognition processing, the text descriptions in each of the at least some power line-down reports to recognize text scene descriptions contained in the text descriptions;

determining, based on the text scene descriptions, a safety warning to avoid a hazard identified within the text description to provide to a respective user of a respective device that a respective power line-down report within the related set of power line-down reports; and sending the safety warning to at least some devices that sent power line-down reports within the related set of power line-down reports.

8. The method of claim 1, wherein the identifying comprises examining a SCADA reporting system for the trouble report associated with the reported electric grid equipment.

9. The method of claim 1, wherein the identifying comprises examining customer reports system to identify received power out reports reported by reporting smart meters located near the line down location, where the reported electric grid equipment comprise the reporting smart meters.

10. The method of claim 1, further comprising:
associating, based on the identifying, the reported electric grid equipment with the consolidated power line-down report;
combining the consolidated power line down report into the trouble report for the reported electric grid equipment;
creating a consolidated issue report comprising the consolidated power line down report and the trouble report; and
prioritizing power line down reports based on evaluating respective severities of other trouble reports and the consolidated issue report.

11. The method of claim 1, further comprising sending to at least one device sending the at least some power line-down reports at the particular power line-down condition, based on receiving the plurality of power line-down reports, a request for additional information about the particular power line-down condition.

12. The method of claim 1, further comprising analyzing, via automated image recognition processing, the at least one of the image or the video in each of the at least some power line-down reports to determine image derived dangerous conditions at the scene of the particular power line-down condition, wherein the image derived dangerous conditions comprise at least one of sparks or fire from a downed power line or standing water near the downed power line, and
wherein the consolidated power line-down report further comprises the image derived dangerous conditions to the consolidated power line-down report.

13. The method of claim 12, further comprising sending a safety warning message to devices located near the particular power line-down condition based on determining the image derived dangerous conditions at the scene of the particular power line-down condition wherein the image derived dangerous conditions comprise at least one of sparks from a downed power line or standing water near the downed power line.

14. A system for processing a plurality of power line-down reports, the system comprising:
a processor;
a memory communicatively coupled to the processor;
the processor, when operating, being configured to:
receive a plurality of power line-down reports where each respective power line-down report in the plurality of power line-down reports is sent by a different respective device operated by different respective users and comprises a respective indication of a respective location of the respective device,
wherein at least some power line-down reports within the plurality of power line-down reports comprise at least one of an image or a video of a scene comprising a view of a particular power line-down condition;
analyze, via automated image recognition processing, the at least one of the image or the video in each of the at least some power line-down reports to identify a particular power line-down report that comprises an image or a video of a downed line that is not a power line;
determine, based on the respective indications of the respective location of the respective device in each power line-down report except for the particular power line down report, a related set of power line-down reports that are all likely to be reporting the particular power line-down condition;
determine, based on a comparison of the respective location indicated in each of the power line down reports in the related set of power line down reports to stored geographic locations of power lines, a line down location corresponding to a geographic location of a power line that is close to locations within the related set of power line down reports
identify, based on searching a set of trouble reports other than power line down reports, a reported electric grid equipment that has a trouble report and that is physically near and separated from the location of the particular power line-down condition or that is electrically connected to a downed power line at the location of the particular power line-down condition;
create, based on the related set of power line-down reports, a consolidated power line-down report comprising:
data associated with the particular power line-down condition;
and
the trouble report for the reported electric grid equipment that is physically near and separated from the location of the particular power line-down condition or that is electrically connected to a downed power line at the location of the particular power line-down condition,
wherein the consolidated power line-down report indicates the line down location indicated as a location of the power line-down condition; and
report the consolidated power line-down re port to a power grid trouble report system.

15. The system of claim 14, wherein the processor is further configured to:
evaluate, relative to other present trouble reports, a severity level of the consolidated power line-down report in conjunction with the trouble report associated with the reported electric grid equipment;
select, based on an evaluation of the severity level of the consolidated power line-down report, a highest priority trouble report from among the other present trouble reports and the consolidated power line-down report in conjunction with the trouble report associated with the reported electric grid equipment; and
dispatch repair personnel to address based on a selection of the highest priority trouble report.

16. The system of claim 14, wherein at least some power line-down reports within the plurality of power line-down reports comprise text descriptions of a scene near the particular power line-down condition, and wherein the processor is further configured to:
analyze, via automated text recognition processing, the text descriptions in each of the at least some power line-down reports to recognize text scene descriptions contained in the text descriptions;
determine text described conditions at the scene of the particular power line-down condition; and
add the text described conditions to the consolidated power line-down report.

17. The system of claim 16, wherein the processor is further configured to:
determine, based on analysis of the text descriptions and the text scene description, a safety warning to avoid a hazard within the text scene description to provide to a respective user of a respective device that a respective power line-down report within the related set of power line-down reports; and
send the safety warning to at least some devices that sent power line-down reports within the related set of power line-down reports.

18. The system of claim 16, where the text recognition processing comprises a machine learning algorithm, and wherein the processor is further configured to:
- receive, prior to receiving the plurality of power line-down reports, a plurality of previously received power line-down reports reporting prior power line-down conditions, the previously received power line-down reports comprising text descriptions of scenes near the prior power line-down conditions;
- receive, from repair personnel sent to repair the prior power line-down conditions, information describing conditions at the scenes near the prior power line-down conditions; and
- incrementally train, prior to receiving the plurality of power line-down reports and based on the text descriptions of scenes near the prior power line-down condition and the information describing conditions at the scenes near the prior power line-down conditions, the machine learning algorithm to better recognize text descriptions of scenes,
- where the processor is configured to analyze by at least analyzing the text descriptions with the machine learning algorithm that has been trained by incremental training.

19. A computer program product for processing a plurality of power line-down reports, the computer program product comprising:
- a non-transitory computer readable storage medium having computer readable program code embodied therein, the computer readable program code comprising instructions for:
  - receiving a plurality of power line-down reports where each respective power line-down report in the plurality of power line-down reports is sent by a different respective device operated by different respective users and comprises a respective indication of a respective location of the respective device,
    - wherein at least some power line-down reports within the plurality of power line-down reports comprise at least one of an image or a video of a scene comprising a view of a particular power line-down condition;
  - analyzing, via automated image recognition processing, the at least one of the image or the video in each of the at least some power line-down reports to identify a particular power line-down report that comprises an image or a video of a downed line that is not a power line;
  - creating a reduced set of power line down reports by excluding, based on identifying the particular power line-down report comprises an image or video of a downed line that is not a power line, the particular power line-down report from the plurality of power line down reports;
  - determining, based on the respective indications of the respective location of the respective device in each power line-down report except for the particular power line down report, a related set of power line-down re ports that are all likely to be reporting the particular power line-down condition;
  - determining, based on comparing the respective location indicated in each of the power line down reports in the related set of power line down reports to stored geographic locations of power lines, a line down location corresponding to a geographic location of a power line that is close to locations within the related set of power line down reports;
  - identifying, based on searching a set of trouble reports other than power line down reports, a reported electric grid equipment that has a trouble report and that is physically near and separated from the location of the particular power line-down condition or that is electrically connected to a downed power line at the location of the particular power line-down condition;
  - creating, based on the related set of power line-down reports, a consolidated power line-down report comprising;
    - data associated with the particular power line-down condition;
    - and
    - the trouble report for the reported electric grid equipment that is physically near and separated from the location of the particular power line-down condition or that is electrically connected to a downed power line at the location of the particular power line-down condition,
  - wherein the consolidated power line-down report indicates the line down location indicated as a location of the power line-down condition; and
  - reporting the consolidated power line-down re port to a power grid trouble report system.

* * * * *